US012785870B2

(12) United States Patent
Maleki et al.

(10) Patent No.: US 12,785,870 B2
(45) Date of Patent: Nov. 3, 2026

(54) NETWORK STRATEGIES FOR MAXIMUM BANDWIDTH AND MAXIMUM COMPONENT CARRIER USER ASSISTANCE INFORMATION UTILIZATION

(71) Applicant: Telefonaktiebolaget LM Ericsson (publ), Stockholm (SE)

(72) Inventors: Sina Maleki, Malmö (SE); Ali Nader, Malmö (SE); Andres Reial, Höllviken (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 351 days.

(21) Appl. No.: 18/579,039

(22) PCT Filed: Jul. 15, 2022

(86) PCT No.: PCT/SE2022/050717

§ 371 (c)(1),
(2) Date: Jan. 12, 2024

(87) PCT Pub. No.: WO2023/003503

PCT Pub. Date: Jan. 26, 2023

(65) Prior Publication Data

US 2024/0322958 A1 Sep. 26, 2024

Related U.S. Application Data

(60) Provisional application No. 63/223,400, filed on Jul. 19, 2021.

(51) Int. Cl.
*H04L 5/00* (2006.01)
*H04W 48/08* (2009.01)

(52) U.S. Cl.
CPC ............ *H04L 5/001* (2013.01); *H04L 5/0064* (2013.01); *H04L 5/0098* (2013.01); *H04W 48/08* (2013.01)

(58) Field of Classification Search
CPC ..... H04L 5/001; H04L 5/0064; H04L 5/0098; H04W 48/08
See application file for complete search history.

(56) References Cited

U.S. PATENT DOCUMENTS

2022/0217042 A1 * 7/2022 Santhanam .......... H04B 7/0404
2024/0195594 A1 * 6/2024 Araujo .................. H04W 76/34

OTHER PUBLICATIONS

International Search Report and Written Opinion dated Dec. 5, 2022 for International Application No. PCT/SE2022/050717 filed Jul. 15, 2022; consisting of 15 pages.

(Continued)

*Primary Examiner* — Duc C Ho
(74) *Attorney, Agent, or Firm* — Weisberg I.P. Law, P.A.

(57) ABSTRACT

A method, network node and wireless device (WD) for implementing network strategies for maximum bandwidth (BW) and maximum component carrier (CC) user assistance information (UAI) utilization are disclosed. According to one aspect, a method in a network node includes receiving UAI including an indication of at least one of a zero bandwidth for a frequency band and a component carrier to be disabled. The method also includes determining an allocation of at least one of a bandwidth and at least one component carrier based at least in part on whether the indicated at least one of the zero bandwidth and the component carrier to be disabled would exclude a primary component carrier by which the network node and the WD maintain communication in a cell.

11 Claims, 8 Drawing Sheets

(56) References Cited

OTHER PUBLICATIONS

3GPP TS 38.331 V16.6.0; 3rd Generation Partnership Project; Technical Specification Group Radio Access Network; NR; Radio Resource Control (RRC) protocol specification (Release 16); Sep. 2021; consisting of 961 pages.
3GPP TSG-RAN WG2 Meeting #109bis R2-2003127; Title: Summary of [Post109e#43][PowSav] UE Assistance and RRC open issues and TDocs; Agenda Item: 6.11.1; Source: MediaTek Inc. (Rapporteur); Document for: Discussion and decision; Date and Location: Apr. 2020, Online; consisting of 36 pages.
3GPP TSG-RAN WG2 Meeting #109 electronic R2-2002383; Title: RAN2#109e agreements and remaining Issues for Power Saving; Source: CATT; Agenda Item: 6.11.1; Document for: Discussion and Decision; Date and Location: Feb. 24-Mar. 6, 2020, Online; consisting of 10 pages.
3GPP TSG-RAN WG2 Meeting #109 electronic R2-2001914; Title: [AT109e][505][Pow] Email discussion on open issues on UE assistance; Agenda item: 6.11.3; Source: Qualcomm Inc; Document for: Discussion and Decision; Date and Location: Feb. 24-Mar. 6, 2020, Elbonia; consisting of 24 pages.

* cited by examiner

--PRIOR ART--

NETWORK STRATEGIES FOR MAXIMUM BANDWIDTH AND MAXIMUM COMPONENT CARRIER USER ASSISTANCE INFORMATION UTILIZATION

CROSS-REFERENCE TO RELATED APPLICATIONS

This application is a Submission Under 35 U.S.C. § 371 for U.S. National Stage Patent Application of International Application No.: PCT/SE2022/050717, filed Jul. 15, 2022 entitled "NETWORK STRATEGIES FOR MAXIMUM BANDWIDTH AND MAXIMUM COMPONENT CARRIER USER ASSISTANCE INFORMATION UTILIZATION," which claims priority to U.S. Provisional Application No. 63/223,400, filed Jul. 19, 2021, entitled "NETWORK STRATEGIES FOR MAXIMUM BANDWIDTH AND MAXIMUM COMPONENT CARRIER USER ASSISTANCE INFORMATION UTILIZATION," the entireties of both of which are incorporated herein by reference.

TECHNICAL FIELD

The present disclosure relates to wireless communications, and in particular, to network strategies for maximum bandwidth (BW) and maximum component carrier (CC) user assistance information (UAI) utilization.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs. Sixth Generation (6G) wireless communication systems are also under development.

User Assistance Information (UAI) may include information from the wireless device that informs the network node of one or more of the following:

- The WD delay budget report carrying a desired increment/decrement in the connected mode discontinuous reception (DRX) cycle length;
- WD overheating assistance information;
- WD in-device coexistence (IDC) assistance information;
- The WD's preference on DRX parameters for power saving;
- The WD's preference on the maximum aggregated bandwidth for power saving;
- The WD's preference on the maximum number of secondary component carriers for power saving;
- The WD's preference on the maximum number of MIMO layers for power saving;
- The WD's preference on the minimum scheduling offset for cross-slot scheduling for power saving;
- assistance information to transition out of RRC_CONNECTED state when the WD does not expect to send or receive data in the near future; or
- configured grant assistance for NR sidelink communication.

FIG. 1 illustrates an example exchange of messages between a WD and a network node. A WD capable of providing its preference on the maximum aggregated bandwidth for power saving in RRC_CONNECTED mode may initiate the procedure in several cases, including upon being configured to provide its maximum aggregated bandwidth preference and upon change of its maximum aggregated bandwidth preference.

A WD capable of providing its preference on the maximum number of secondary component carriers for power saving in RRC_CONNECTED mode may initiate the procedure in several cases, including upon being configured to provide its maximum number of secondary component carriers preference and upon change of its maximum number of secondary component carriers preference.

The WD may operate as follows:

If configured to provide the WD's preference on the maximum aggregated bandwidth for power saving, then:

- if the WD did not transmit a WDAssistance Information message with maxBW-Preference since it was configured to provide its preference on the maximum aggregated bandwidth for power saving; or
- if the current preference on the maximum aggregated bandwidth is different from the one indicated in the last transmission of the WDAssistanceInformation message including maxBW-Preference and timer T346b is not running: then
- start timer T346b with the timer value set to the maxBW-PreferenceProhibitTimer;
- initiate transmission of the WDAssistanceInformation message in accordance with 3GPP NR Technical Standard (TS) 38.331 section 5.7.4.3 to provide its preference on the maximum aggregated bandwidth for power saving;

If configured to provide its preference on the maximum number of secondary component carriers for power saving, then:

- if the WD did not transmit a WDAssistanceInformation message with maxCC-Preference since it was configured to provide its preference on the maximum number of secondary component carriers for power saving; or
- if the current preference on the maximum number of secondary component carriers is different from the one indicated in the last transmission of the WDAssistanceInformation message including maxCC-Preference and timer T346c is not running: then
  - start timer T346c with the timer value set to the maxCC-PreferenceProhibitTimer; or
  - initiate transmission of the WDAssistance Information message in accordance with 3GPP NR TS 38.331 section 5.7.4.3 to provide its preference on the maximum number of secondary component carriers for power saving.

If transmission of the WDAssistanceInformation message is initiated to provide its preference on the maximum aggregated bandwidth for power saving according to 3GPP NR TS 38.331 section 5.7.4.2: then include maxBW-Preference in the WDAssistanceInformation message, and then:

- if the WD prefers to reduce the maximum aggregated bandwidth of FR1, then:
- include reducedMaxBW-FR1 in the MaxBW-Preference information element (IE);
- set reducedBW-FR1-DL to the maximum aggregated bandwidth the WD desires to have configured across all downlink carriers of FR1;
- set reducedBW-FR1-UL to the maximum aggregated bandwidth the WD desires to have configured across all uplink carriers of FR1;

If the WD prefers to reduce the maximum aggregated bandwidth of FR2, then:

include reducedMaxBW-FR2 in the MaxBW-Preference IE;

set reducedBW-FR2-DL to the maximum aggregated bandwidth the WD desires to have configured across all downlink carriers of FR2;

set reducedBW-FR2-UL to the maximum aggregated bandwidth the WD desires to have configured across all uplink carriers of FR2;

If transmission of the WDAssistanceInformation message is initiated to provide its preference on the maximum number of secondary component carriers for power saving according to 3GPP NR TS 38.331 section 5.7.4.2, then:

include maxCC-Preference in the WDAssistanceInformation message;

set reducedCCsDL to the number of maximum SCells the WD desires to have configured in the downlink;

set reducedCCsUL to the number of maximum SCells the WD desires to have configured in the uplink.

The following pseudocode may be used to configure the WD to operate in the described manner:

```
MaxBW-Preference-r16 ::=              SEQUENCE {
  reducedMaxBW-FR1-r16                  SEQUENCE {
    reducedBW-FR1-DL-r16                  ReducedAggregatedBandwidth,
    reducedBW-FR1-UL-r16                  ReducedAggregatedBandwidth
  } OPTIONAL,
  reducedMaxBW-FR2-r16                  SEQUENCE {
    reducedBW-FR2-DL-r16                  ReducedAggregatedBandwidth,
    reducedBW-FR2-UL-r16                  ReducedAggregatedBandwidth
  } OPTIONAL
}
MaxCC-Preference-r16 ::=              SEQUENCE {
  reducedCCsDL-r16                    INTEGER (0..31),
  reducedCCsUL-r16                    INTEGER (0..31)
}
ReducedAggregatedBandwidth ::= ENUMERATED {mhz0, mhz10, mhz20,
mhz30, mhz40, mhz50, mhz60, mhz80, mhz100, mhz200, mhz300, mhz400}
MaxBW-PreferenceConfig-r16 ::=  SEQUENCE {
  maxBW-PreferenceProhibitTimer-r16  ENUMERATED {
                                       s0, s0dot5, s1, s2, s3, s4, s5, s6, s7,
                                       s8, s9, s10, s20, s30, spare2, spare1}
}
MaxCC-PreferenceConfig-r16 ::=  SEQUENCE {
maxCC-PreferenceProhibitTimer-r16  ENUMERATED {
                                       s0, sodot5, s1, s2, s3, s4, s5, s6, s7,
                                       s8, s9, s10, s20, s30, spare2, spare1}
```

In 3GPP NR Technical Release 16 (3GPP Rel-16), the WD can indicate its preference for maximum aggregated bandwidth (BW) for each of FR1 or FR2 (MaxBW-Preference-r16) and for each of the uplink (UL) direction and the downlink (DL) direction, and the maximum number of secondary component carriers for UL and DL (MaxCC-Preference-r16). The requested behavior from the network node may be to reduce the aggregated BW or the number of component carriers. Nevertheless, the network node has different tools in order to achieve this. For example, the network node can decide to deactivate some carrier components or reduce the aggregated BW by changing bandwidth parts (BWPs), or reducing a number of component carriers. Furthermore, the network node can also use other tools such as Scell dormancy indication on the primary cell (Pcell) or a secondary cell (Scell) and thereby indicate to the WD that it can stop monitoring the physical downlink control channel (PDCCH) on specific secondary component carriers.

Additionally, the problem can become more pressing when the WD can indicate a preference for maximum aggregated BW of 0 (hereinafter referred to as 0-BW), or for a maximum number of carrier components of 0 (hereinafter referred to as 0-CC). In such a case, 3GPP specifications have not clearly defined what the network node should do, or what the WD expects the network node to do. Only one case is described for dual connectivity (e.g., EN-DC) where the WD indicates 0-CC and 0-BW in order to indicate that the WD does not prefer NR connectivity. Particularly, for 0-BW, in some cases it is not possible for the network node to just simply turn off the whole BW, as this leads to the WD not being connected at all to the NR radio access network (RAN), e.g., if the primary cell (Pcell) is located in the same frequency range as the 0-BW indication.

Depending on the WD implementation (radio frequency (RF) architecture), energy consumption may depend on not only on the number of secondary carriers but on which secondary carriers are activated by the network node. These secondary carriers may be processed in different transceivers that are independently power-managed. The WD could potentially switch off transceivers and processing chains associated with the carriers when not in use. Hence, for the same number of component carriers, different power consumption levels may result, depending on which component carriers the network node activates. However, there is currently no mechanism for the WD to inform the network node of which carriers the WD desires to have deactivated.

SUMMARY

Some embodiments advantageously provide methods, systems, and apparatuses for network strategies for maximum bandwidth (BW) and maximum component carrier (CC) user assistance information (UAI) utilization.

Some embodiments employ user assistance information (UAI) for preferred maximum aggregated BW or preferred maximum number of secondary carriers, particularly for the case where UAI indicates 0-BW and/or 0-CC.

Some embodiments include mechanisms and strategies that the network node may adopt to make decisions upon reception of UAI 0-CC and/or 0-BW. Particularly, criteria and mechanisms are provided to enable the network node to perform one or more of the following:

Configure each of the UAI for maximum aggregated BW or maximum number of secondary component carrier;

Provide configuration parameters, e.g., ReducedAggregatedBandwidth, maxBW-PreferenceProhibitTimer-r16, MaxCC-Preference-r16, maxCC-PreferenceProhibitTimer-r16;

Specify network node behavior upon reception of UAI for 0-BW and/or 0-CC; and/or Receive information from the WD preferences for which of the secondary carriers the WD prefers.

Some embodiments provide the network node with efficient strategies for configuring the UAI for a preferred maximum aggregated BW or a preferred maximum number of secondary component carriers so that the WD can achieve power savings without frequently hindering network node operations.

According to one aspect, a method in a network node configured to communicate with a wireless device, WD, includes receiving user assistance information, UAI, comprising an indication of at least one of a zero bandwidth for a frequency band and a component carrier to be disabled. The method also includes determining an allocation of at least one of a bandwidth and at least one component carrier based at least in part on whether the indicated at least one of the zero bandwidth and the component carrier to be disabled would exclude a primary component carrier by which the network node and the WD maintain communication in a cell.

According to this aspect, in some embodiments, determining the allocation includes configuring the WD to disable transmission of an indication of either one of a zero bandwidth and a component carrier to be disabled that would exclude the primary component carrier. In some embodiments, determining the allocation includes ignoring an indication of either one of a zero bandwidth and a component carrier to be disabled that would exclude the primary component carrier. In some embodiments, determining the allocation includes selecting a component carrier to be disabled in one of a first frequency range and a second frequency range based at least in part on which of the first and second frequency ranges includes the primary component carrier. In some embodiments, determining the allocation includes determining whether a total bandwidth allocated to the WD exceeds a threshold. In some embodiments, the method also includes ignoring subsequent UAI for a period of time after receiving first UAI. In some embodiments, a duration of the period of time is based at least in part on a rate of change of traffic load for the WD. In some embodiments, a duration of the period of time is a first value when the indication indicates zero bandwidth and is a second value when the first indication indicates a component carrier to be disabled. In some embodiments, determining the allocation includes allocating carrier power to a component carrier that is not to be disabled. In some embodiments, when the indication indicates all component carriers are to be disabled, the method further includes configuring the WD to be in a dormant state while maintaining communication between the network node and the wireless device on the primary component carrier.

According to another aspect, a network node configured to communicate with a wireless device, WD, is provided. The network node includes a radio interface configured to receive user assistance information, UAI, comprising an indication of at least one of a zero bandwidth for a frequency band and an indication of a component carrier to be disabled; and processing circuitry in communication with the radio interface and configured to determine an allocation of at least one of a bandwidth and at least one component carrier based at least in part on whether the indicated at least one of the zero bandwidth and the component carrier to be disabled would exclude a primary component carrier by which the network node and the WD maintain communication in a cell.

According to this aspect, in some embodiments, determining the allocation includes configuring the WD to disable transmission of an indication of either one of a zero bandwidth and a component carrier to be disabled that would exclude the primary component carrier. In some embodiments, determining the allocation includes ignoring an indication of either one of a zero bandwidth and a component carrier to be disabled that would exclude the primary component carrier. In some embodiments, determining the allocation includes selecting a component carrier to be disabled in one of a first frequency range and a second frequency range based at least in part on which of the first and second frequency ranges includes the primary component carrier. In some embodiments, determining the allocation includes determining whether a total bandwidth allocated to the WD exceeds a threshold. In some embodiments, the processing circuitry is further configured to ignore subsequent UAI received during a period of time after receiving first UAI. In some embodiments, a duration of the period of time is based at least in part on a rate of change of traffic load for the WD. In some embodiments, a duration of the period of time is a first value when the indication indicates zero bandwidth and is a second value when the indication indicates a component carrier to be disabled. In some embodiments, determining the allocation includes allocating carrier power to at least one component carrier that is not to be disabled. In some embodiments, when the indication indicates all component carriers are to be disabled, the processing circuitry is further configured to configure the WD to be in a dormant state while maintaining communication between the network node and the wireless device on the primary component carrier.

According to yet another aspect, a method in a wireless device, WD, configured to communicate with a network node, includes: determining at least one of a zero bandwidth and a component carrier to be disabled based at least in part on an amount of power consumed by circuitry of the WD for each of a plurality of component carriers; and transmitting user assistance information, UAI, comprising an indication of at least one of the determined zero frequency bandwidth and the determined component carrier to be disabled, the indication being based at least in part on the consumed power for each of the plurality of component carriers.

According to this aspect, in some embodiments, determining at least one component carrier based at least in part on an amount of consumed power includes determining whether a component carrier is a primary component carrier by which the network node and the WD maintain communication in a cell. In some embodiments, determining at least one component carrier based at least in part on an amount of consumed power includes selecting a component carrier to be disabled in one of a first frequency range and a second frequency range based at least in part on a power requirement associated with each of the first and second frequency ranges. In some embodiments, the method also includes disabling transmission of UAI in response to an indication from the network node that configures the WD not to transmit the UAI during a period of time. In some embodiments, the method also includes disabling component carriers according to a configuration indicated by the network node. In some embodiments, the method also includes not disabling a primary component carrier by which the network node and the WD maintain communication in a cell in response to an indication from the network node.

According to another aspect, a WD configured to communicate with a network node is provided. The WD includes processing circuitry configured to determine at least one of a zero bandwidth and a component carrier to be disabled based at least in part on an amount of power consumed by circuitry of the WD for each of a plurality of component carriers. The WD also includes a radio interface in communication with the processing circuitry and configured to transmit user assistance information, UAI, comprising an indication of at least one of the determined zero bandwidth and the determined component carrier to be disabled, the indication being based at least in part on the consumed power for each of the plurality of component carriers.

According to this aspect, in some embodiments, determining at least one component carrier based at least in part on an amount of consumed power includes determining whether a component carrier is a primary component carrier by which the network node and the WD maintain communication in a cell. In some embodiments, determining at least one component carrier based at least in part on an amount of consumed power includes selecting a component carrier to be disabled in one of a first frequency range and a second frequency range based at least in part on a power requirement associated with each of the first and second frequency ranges. In some embodiments, the processing circuitry is further configured to disable transmission of UAI in response to an indication from the network node that configures the WD not to transmit the UAI during a period of time. In some embodiments, the processing circuitry is further configured to disable component carriers according to a configuration indicated by the network node. In some embodiments, the processing circuitry is further configured to not disable a primary component carrier by which the network node and the WD maintain communication in a cell in response to an indication from the network node.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
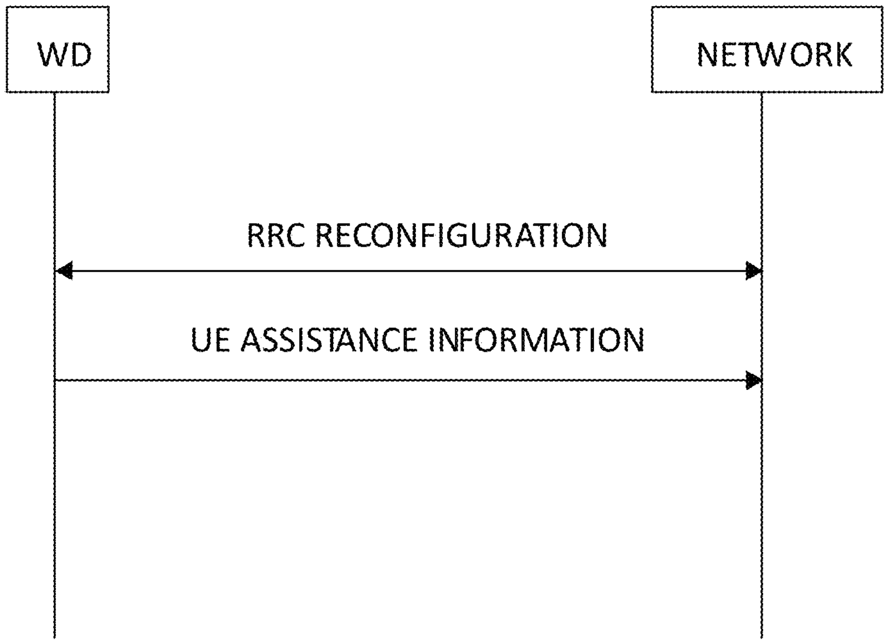
FIG. 1 illustrates an exchange of messages between a WD and a network node.

Before describing in detail example embodiments, it is noted that the embodiments reside primarily in combinations of apparatus components and processing steps related to network strategies for maximum bandwidth (BW) and maximum component carrier (CC) user assistance information (UAI) utilization. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as “first” and “second,” “top” and “bottom,” and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms “a”, “an” and “the” are intended to include the plural forms as well, unless the context clearly indicates otherwise. It will be further understood that the terms “comprises,” “comprising,” “includes” and/or “including” when used herein, specify the presence of stated features, integers, steps, operations, elements, and/or components, but do not preclude the presence or addition of one or more other features, integers, steps, operations, elements, components, and/or groups thereof.

In embodiments described herein, the joining term, “in communication with” and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term “coupled,” “connected,” and the like, may be used herein to indicate a connection, although not necessarily directly, and may include wired and/or wireless connections.

The term “network node” used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide network strategies for maximum bandwidth (BW) and maximum component carrier (CC) user assistance information (UAI) utilization.

Figure 2:
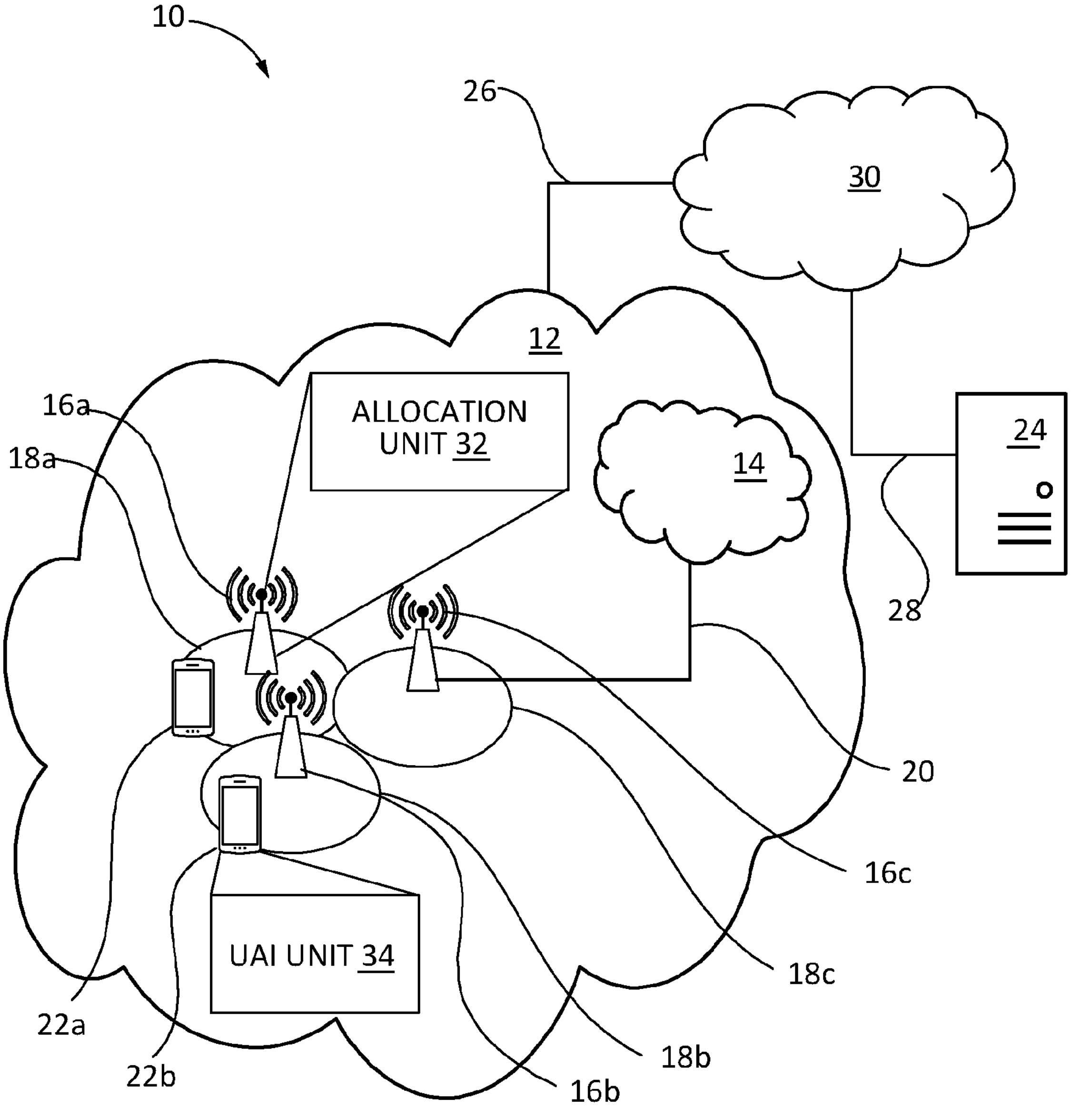
FIG. 2 is a schematic diagram of an example network architecture illustrating a communication system connected via an intermediate network to a host computer according to the principles in the present disclosure.

Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not, or need not, be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include an allocation unit 32 configured to determine an allocation of at least one of a bandwidth and at least one component carrier based at least in part on whether the indicated at least one of the zero bandwidth and the component carrier to be disabled would exclude a primary component carrier by which the network node and the WD maintain communication in a cell. A WD 22 is configured to include a UAI unit 34 configured to determine at least one of a zero bandwidth and a component carrier to be disabled based at least in part on an amount of power consumed by circuitry of the WD for each of a plurality of component carriers.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include an allocation unit 32 configured to determine an allocation of at least one of a bandwidth and at least one component carrier based at least in part on whether the indicated at least one of the zero bandwidth and the component carrier to be disabled would exclude a primary component carrier by which the network node and the WD maintain communication in a cell.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, processing circuitry 84 of the WD 22 may include a UAI unit 34 configured to determine at least one of a zero bandwidth and a component carrier to be disabled based at least in part on an amount of power consumed by circuitry of the WD for each of a plurality of component carriers.

Figure 3:
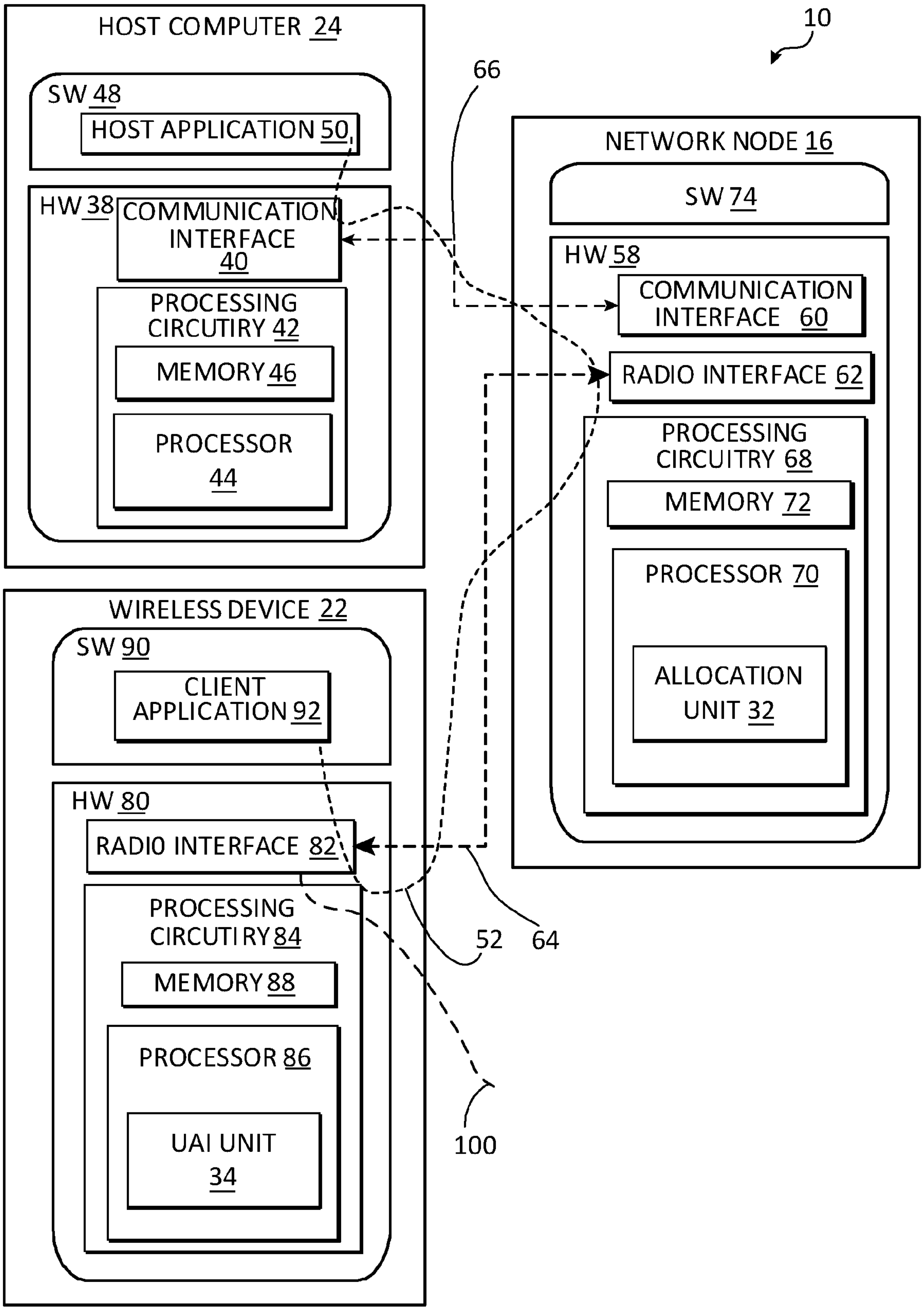
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as allocation unit 32 or UAI unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 4:
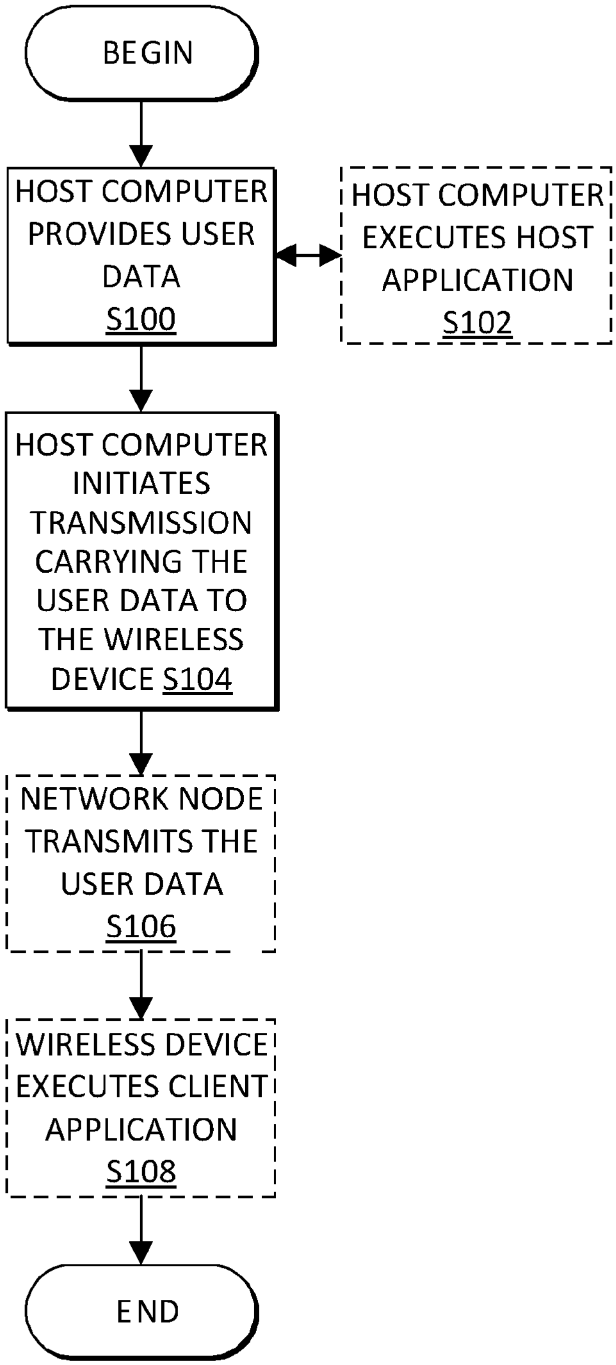
FIG. 4 is a flowchart illustrating example methods implemented in a communication system including a host computer, a network node and a wireless device for executing a client application at a wireless device according to some embodiments of the present disclosure.

FIG. 4 is a flowchart illustrating an example method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

Figure 5:
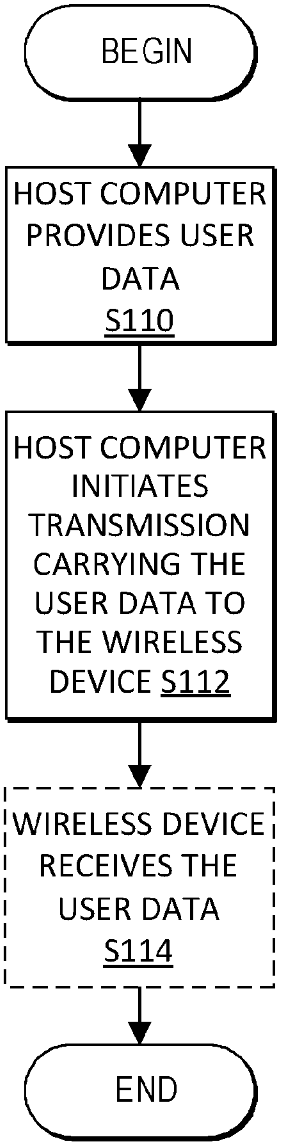
FIG. 5 is a flowchart illustrating example methods implemented in a communication system including a host computer, a network node and a wireless device for receiving user data at a wireless device according to some embodiments of the present disclosure.

FIG. 5 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 6:
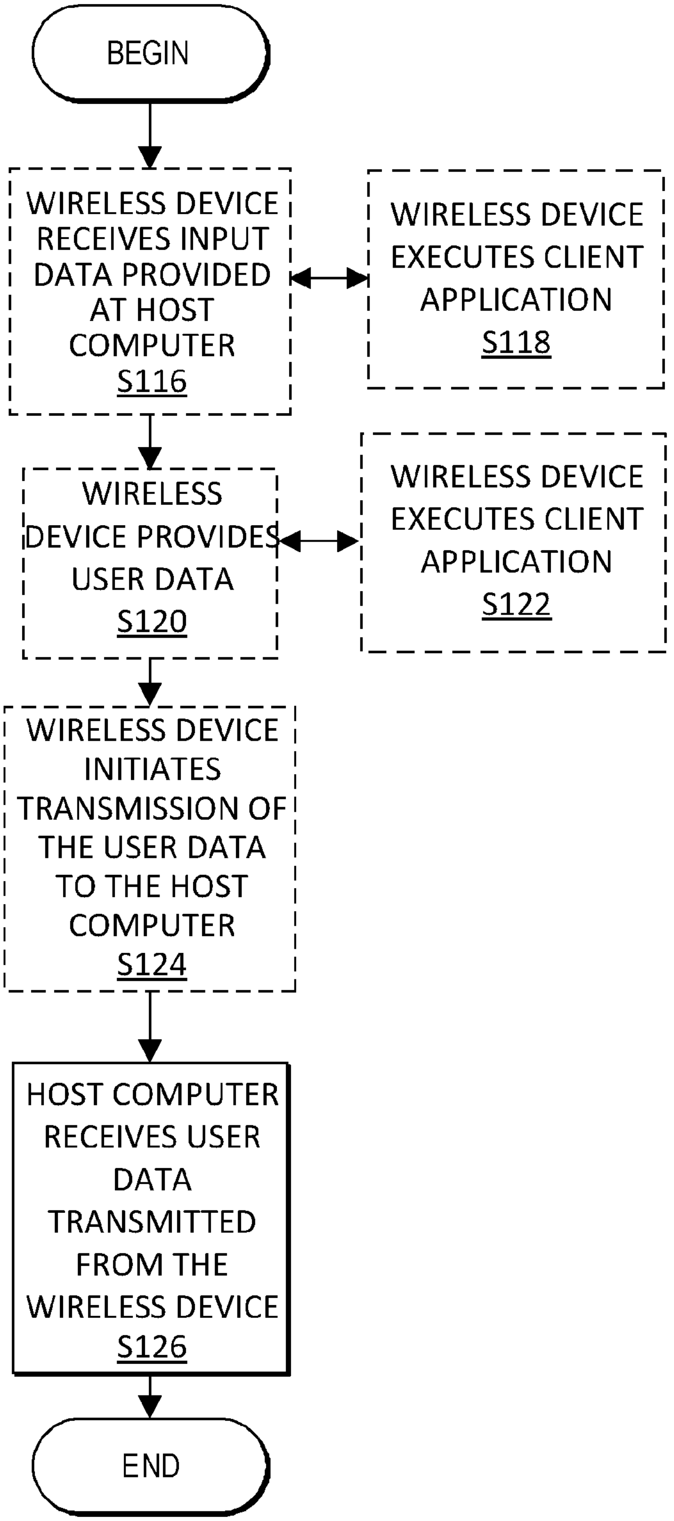
FIG. 6 is a flowchart illustrating example methods implemented in a communication system including a host computer, a network node and a wireless device for receiving user data from the wireless device at a host computer according to some embodiments of the present disclosure.

FIG. 6 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 7:
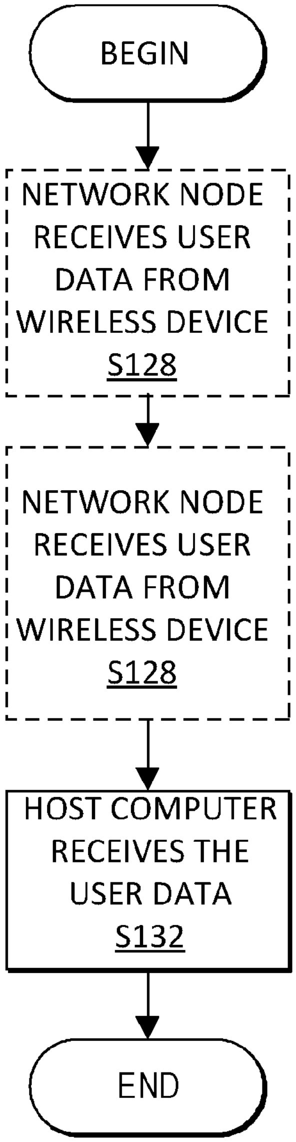
FIG. 7 is a flowchart illustrating example methods implemented in a communication system including a host computer, a network node and a wireless device for receiving user data at a host computer according to some embodiments of the present disclosure.

FIG. 7 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
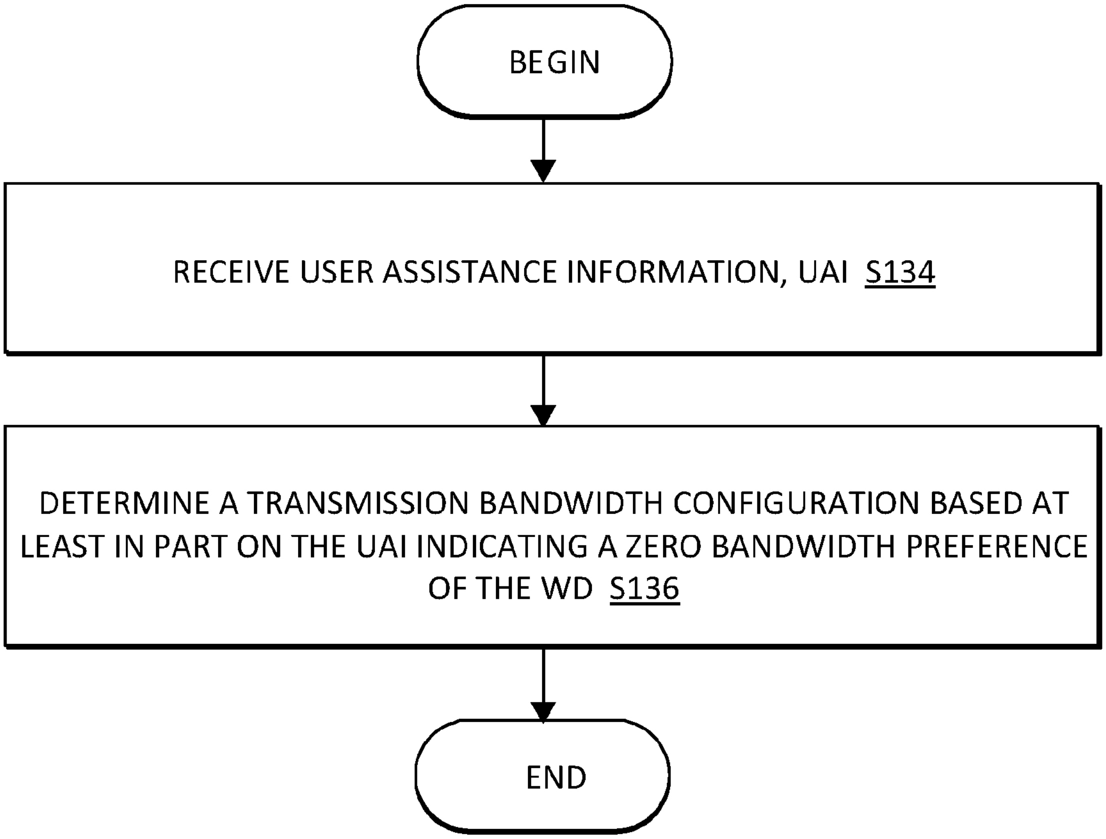
FIG. 8 is a flowchart of an example process in a network node for implementing network strategies for maximum bandwidth (BW) and maximum component carrier (CC) user assistance information (UAI) utilization.

FIG. 8 is a flowchart of an example process in a network node 16 configured to implement network strategies for maximum bandwidth (BW) and maximum component carrier (CC) user assistance information (UAI) utilization. One or more blocks described herein may be performed by one or more elements of network node 16 such as by one or more of processing circuitry 68 (including the allocation unit 32), processor 70, radio interface 62 and/or communication interface 60. Network node 16 such as via processing circuitry 68 and/or processor 70 and/or radio interface 62 and/or communication interface 60 is configured to receive user assistance information, UAI (Block S134). The process also includes determining a transmission bandwidth configuration based at least in part on the UAI indicating a zero bandwidth preference of the WD (Block S136).

Figure 9:
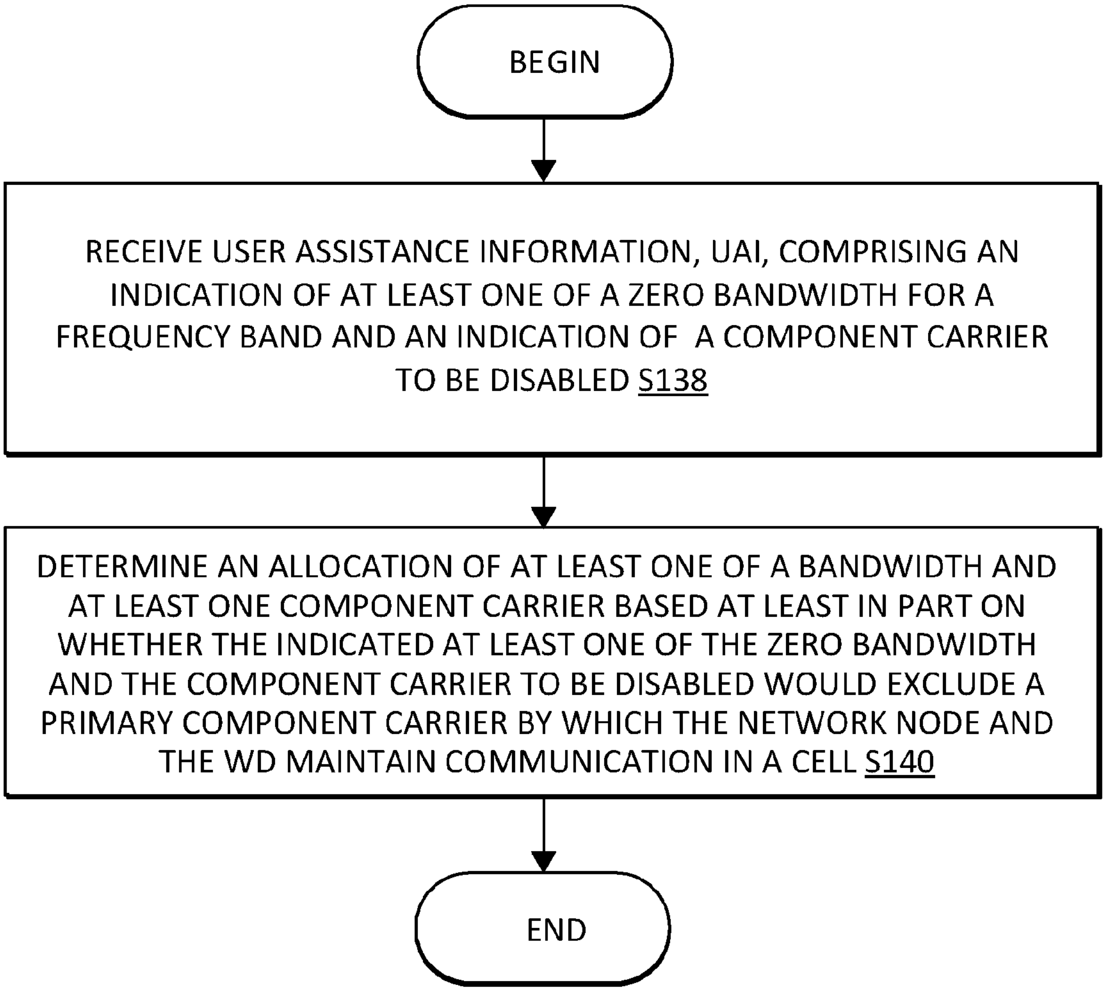
FIG. 9 is a flowchart of another example process in a network node for implementing network strategies for maximum BW and maximum CC UAI utilization.

FIG. 9 is a flowchart of an example process in a network node 16 configured to implement network strategies for maximum bandwidth (BW) and maximum component carrier (CC) user assistance information (UAI) utilization. One or more blocks described herein may be performed by one or more elements of network node 16 such as by one or more of processing circuitry 68 (including the allocation unit 32), processor 70, radio interface 62 and/or communication interface 60. Network node 16 such as via processing circuitry 68 and/or processor 70 and/or radio interface 62 and/or communication interface 60 is configured to receive user assistance information, UAI, comprising an indication of at least one of a zero bandwidth for a frequency band and a component carrier to be disabled (Block S138). The process also includes determining an allocation of at least one of a bandwidth and at least one component carrier based at least in part on whether the indicated at least one of the zero bandwidth and the component carrier to be disabled would exclude a primary component carrier by which the network node and the WD maintain communication in a cell (Block S140).

In some embodiments, determining the allocation includes configuring the WD to disable transmission of an indication of either one of a zero bandwidth and a component carrier to be disabled that would exclude the primary component carrier. In some embodiments, determining the allocation includes ignoring an indication of either one of a zero bandwidth and a component carrier to be disabled that would exclude the primary component carrier. In some embodiments, determining the allocation includes selecting a component carrier to be disabled in one of a first frequency range and a second frequency range based at least in part on which of the first and second frequency ranges includes the primary component carrier. In some embodiments, determining the allocation includes determining whether a total bandwidth allocated to the WD exceeds a threshold. In some embodiments, the method also includes ignoring subsequent UAI for a period of time after receiving first UAI. In some embodiments, a duration of the period of time is based at least in part on a rate of change of traffic load for the WD. In some embodiments, a duration of the period of time is a first value when the indication indicates zero bandwidth and is a second value when the first indication indicates a component carrier to be disabled. In some embodiments, determining the allocation includes allocating carrier power to a component carrier that is not to be disabled. In some embodiments, when the indication indicates all component carriers are to be disabled, the method further includes configuring the WD to be in a dormant state while maintaining communication between the network node and the wireless device on the primary component carrier.

Figure 10:
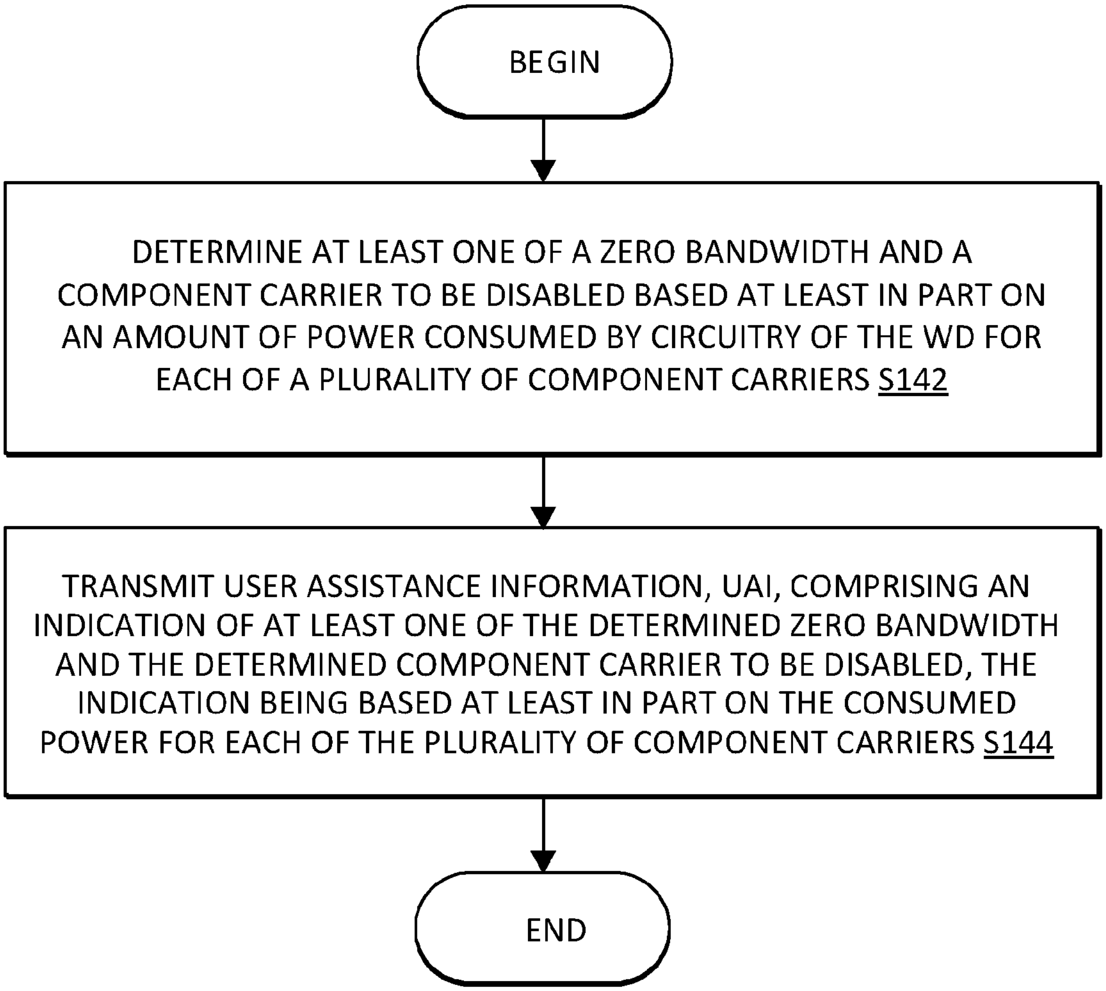
FIG. 10 is a flowchart of an example process in a WD for determining UAI according to principles set forth herein.

FIG. 10 is a flowchart of an example process in a WD 22 configured to implement network strategies for maximum bandwidth (BW) and maximum component carrier (CC) user assistance information (UAI) utilization. One or more blocks described herein may be performed by one or more elements of WD 22 such as by one or more of processing circuitry 84 (including the UAI unit 34), processor 86, radio interface 82 and/or communication interface 40. WD 22 such as via processing circuitry 84 and/or processor 86 and/or radio interface 82 and/or communication interface 40 is configured to determine at least one of a zero bandwidth and a component carrier to be disabled based at least in part on an amount of power consumed by circuitry of the WD for each of a plurality of component carriers (Block S142). The process also includes transmitting user assistance information, UAI, comprising an indication of at least one of the determined zero frequency bandwidth and the determined component carrier to be disabled, the indication being based at least in part on the consumed power for each of the plurality of component carriers. (Block S144).

In some embodiments, determining at least one component carrier based at least in part on an amount of consumed power includes determining whether a component carrier is a primary component carrier by which the network node and the WD maintain communication in a cell. In some embodiments, determining at least one component carrier based at least in part on an amount of consumed power includes selecting a component carrier to be disabled in one of a first frequency range and a second frequency range based at least in part on a power requirement associated with each of the first and second frequency ranges. In some embodiments, the method also includes disabling transmission of UAI in response to an indication from the network node that configures the WD not to transmit the UAI during a period of time. In some embodiments, the method also includes disabling component carriers according to a configuration indicated by the network node. In some embodiments, the method also includes not disabling a primary component carrier by which the network node and the WD maintain communication in a cell in response to an indication from the network node.

Having described the general process flow of arrangements of the disclosure and having provided examples of hardware and software arrangements for implementing the processes and functions of the disclosure, the sections below provide details and examples of arrangements for network maximum bandwidth (BW) and maximum component carrier (CC) user assistance information (UAI) utilization.

In some embodiments, the network node 16 may choose to configure MaxBW UAI in ways that would not allow the WD 22 to indicate 0-BW for the FR containing the primary cell (Pcell), or to ignore such indication, to avoid the ambiguity in Pcell handling.

In some embodiments, the network node 16 may decide to configure the UAI for maximum aggregated BW, based on the operating frequency range. For example, the network node 16 may decide not to configure the MaxBW-Preference for the operating frequency range that includes the Pcell but to configure the MaxBW-Preference for the operating frequency range that does not include the Pcell. The WD 22 may indicate a 0-BW preference or a low BWP preference on the frequency range which includes the Pcell, which the network node 16 cannot accommodate since it cannot turn off Pcell operations. More specifically, the network node 16 may configure MaxBW-Preference for FR2, if the Pcell is in FR1 but not for FR1, or vice versa.

In another example, the network node 16 may decide not to configure MaxBW-Preference for the WD 22 if the WD 22 is only active in FR1 or FR2, but configure MaxBW-Preference if the WD 22 is active in both frequency ranges. This is to help ensure that the WD 22 cannot indicate preference for 0-BW or low BW. Alternatively, the network node 16 may still decide to configure the feature if the total BW is more than a specific first threshold, but ignore all the BW preferences that the WD 22 sends that are below a specific second threshold. As such, the network node 16 defines a minimum BW in each frequency range which is absolutely necessary for carrying on the network node 16 operations, and ignores the WD 22 BW preferences which are below this threshold.

In another example, the network node 16 may still configure MaxBW-Preference for either frequency range, but ignore the UAI for 0-BW for the frequency range which includes the Pcell. Alternatively, if the current DL buffer and buffer status report (BSR) is empty and the network node 16 does not expect large upcoming traffic, the network node 16 can release the WD 22 and send the WD to RRC_Idle/Inactive states.

Moreover, the network node 16 may decide to configure the MaxBW-Preference for DL or UL, or for both, based on the operating frequency. For example, the network node 16 may decide not to configure the WD 22 with MaxBW-Preference for UL in FR1, but not in FR2 (unless FR2 is the only available UL frequency range), or ignore 0-BW for UL in FR1 or FR2 if FR2 is the only available UL frequency range. The network node 16 may do so because the UL frequency may ensure that the signal quality as well as WD 22 power savings are achieved. For example, the WD 22 may consume more power for the UL in FR2 than in FR1. Therefore, if the WD 22 has an UL in both FR1 and FR2, the network node 16 may decide to turn off FR2 to help the WD 22 conserve power, but keep FR1 to make sure the UL operations continue. Nevertheless, the network node 16 may reduce the UL BW to a minimum BW required for carrying on the UL operations.

In some embodiments, the network node 16 configures prohibit timers to prevent abuse of the UAI mechanism by WDs and encourage unbiased use of the mechanism. In some embodiments, if the network node 16 decides to configure MaxBW-Preference for FR1 and/or FR2, the network node 16 may set the maxBW-PreferenceProhibit-Timer-r16 to s30 (30 seconds), for example. Or, the network node 16 may set maxBW-PreferenceProhibitTimer-r16 to a maximum value below infinity. The network node 16 may decide to configure MaxBW-Preference to make sure the WD 22 does not send frequent UAIs and potentially contradictory indications. The network node 16 may decide to configure lower prohibit time values, if it observes that the WD 22 traffic load changes faster than every 30 sec, and if the UAI related to maxBW-Preference is consistent with actual traffic arrival patterns. This may enable the WD 22 to achieve further power savings.

In another example, the network node 16 may consider lower prohibit timer values by observing the WD 22 behavior with regard to the specific UAI for maxBW-Preference or general WD 22 behavior with regard to the UAI. If the network node 16 notes that the WD 22 UAI is helpful for network node 16 operation, and does not hinder network node 16 operation, the network node 16 may lower the prohibit timers to help the WD 22 conserve power while not hindering the operations of the network node 16.

In another example, for UAI types where this is possible, the network node 16 may decide to configure the prohibit timer to infinity, and as such only give the WD 22 one opportunity to request a preferred bandwidth per radio resource control (RRC) session. This may ensure that the WD 22 only uses that resource in case of severe power savings requirements.

In another example, the network node 16 may configure a longer prohibit timer for the WD 22 in response to UAI that indicates the WD 22 should conserve more power. The UAI can be any of MaxBW-preference, MaxCC-Preference, discontinuous reception (DRX) preference, max multiple input multiple output (MIMO) layers preference, preferred minimum offset values, i.e., k0 and K2 values, and so on. The network node 16 may do so to enable the WD 22 to send less frequent UAI to conserve power.

Configuration of MaxCC-Preference

In some embodiments, the network node 16 configures the MaxCC UAI only when the traffic dynamics and/or the number of secondary Scell resources call for adaptation of the number of active CCs.

In some embodiments, the network node 16 may decide to configure MaxCC-Preference only if the number of secondary component carriers are above a specific threshold. For example, if the WD 22 is only configured with one Scell, then the network node 16 may decide not to configure a MaxCC-Preference. But if the WD 22 is configured with more secondary cells (Scells), then the network node 16 may decide to configure MaxCC-Preference. Furthermore, the network node 16 may decide to configure MaxCC-Preference for DL but not UL. For example, if the UL Scell is in a more robust frequency range the network node 16 may configure MaxCC-Preference to make sure UL operations continue, or vice versa.

In another example, the network node 16 may decide to configure MaxCC-Preference based on the traffic load. For example, if the load is higher than a specific threshold, then the network node 16 may decide to not configure the feature, MaxCC-Preference, to maintain scheduling flexibility, but if the load is lower than a threshold, the network node 16 may decide to configure the feature, MaxCC-Preference.

In some embodiments, if the network node 16 decides to configure MaxCC-Preference, the network node 16 may decide to configure the WD 22 with the maximum possible prohibit timer except infinity. For example, the network node 16 may configure maxCC-PreferenceProhibitTimer to s30, i.e., a prohibit timer of 30 s, to enable the WD 22 to use the feature only when a need arises such as when there is a need to reduce the number of component carriers.

In some embodiments, the network node 16 may decide to configure a lower value of prohibit timer based on traffic load change, and/or WD historical behavior with regard to the specific UAI for maxCC-Preference or the generic WD behavior with regard to UAI, as in the case of MaxBW-Preference described above.

In another example, the network node 16 may decide to configure a prohibit timer of infinity to give the WD 22 only one opportunity to request a BW preference so that the WD 22 only uses the feature when greater power conservation is needed.

In another example, the network node 16 may configure different prohibit timers for different UAI. For example, the WD 22 may need a shorter prohibit timer for MaxCC-Preference with respect to MaxBW-preference. This may be done because it is easier for the network node 16 to release a component carrier (CC) or indicate Scell dormancy to the WD 22 than to change the network node's whole BW or BWP operation strategy. Alternatively, the network node 16 may have a large amount of BW implementation flexibility, e.g., multiple BWPs potentials to indicate a different operation BW to the WD 22 in response to MaxBW-preference.

Network Node Behavior Upon Reception of 0-BW and/or 0-CC UAI

Network Node Behavior when Receiving 0-BW

In some embodiments, in response to 0-BW UAI, the network node 16 preferably removes Scells in the frequency range (FR) that does not contain the Pcell, and in any case keeps the Pcell operational regardless of the indication. The reason is that the WD 22 needs the Pcell operations in order to stay connected. Alternatively, the network node 16 can reduce the Pcell BW to the minimum BW necessary to carry on the underlying operations, e.g., measurements and reports.

In one embodiment, the network node 16 receives a UAI for 0-BW on FR2. In one example, the network node 16 may decide to deactivate the FR2 Scell if the Pcell is in FR1. Then, the WD 22 achieves power savings, but the WD 22 connectivity remains in place through FR1. In another example, if the Pcell is also located in FR2, the network node 16 may decide to either ignore the 0-BW preference, or deactivate all the FR2 Scells and lower FR2 Pcell BWPs if possible. This allows the WD 22 to maintain connectivity while conserving power.

In another embodiment, if the network node 16 receives a UAI for 0-BW in FR1, the network node 16 may ignore the preference. The network node 16 may do so because the FR1 is a more reliable link to stay connected to the WD 22, and because the WD 22 has lower power consumption in FR1. In another example, particularly if the network node 16 has not configured the maximum BW preference for FR2, the network node 16 may decide to still deactivate FR2 Scells if the Pcell is in FR1. This may be done by interpreting 0-BW in FR1 as a need for power savings and/or a predicted lack of sufficient data volume for the Scells.

Yet, in another example, the WD 22 may deactivate all the Scells in FR1 and/or FR2, and additionally lower the BWP of the Pcell, if possible, upon reception of 0-BW in FR1. This enables the WD 22 to achieve a maximum power savings while also maintaining connectivity.

Network Node Behavior when Receiving 0-CC

In some embodiments, the network node 16 selects an Scell power saving mode in response to 0-CC UAI to balance power saving and reduce the risk that an imminent data burst will not be able to utilize Scell resources.

In one embodiment, when the WD 22 is only configured with one Scell or currently has only one activated Scell, then upon reception of 0-CC preference, the network node 16 may first indicate Scell dormancy to the WD 22. If the WD 22 is not brought back from dormancy after N discontinuous reception (DRX) cycles (if additionally configured with DRX), or after a specific duration of time, the network node 16 can deactivate the Scell. This can be done by sending an Scell deactivation command via a medium access control (MAC) control element (CE). The network node 16 may place the WD 22 in dormancy rather than deactivate the Scell because it takes much longer to deactivate and reactivate an Scell (10 milliseconds) than bringing the WD 22 into and out of Scell dormancy (3 milliseconds)

In some embodiments, if the WD 22 has more than one activated Scell at the time of reception of 0-CC preference, the network node 16 can deactivate all the Scells except one and send that one to dormancy. In choosing which Scell to keep, the network node 16 may decide to keep the Scell if it is in FR1, but not if it is in FR2. The reason to do so is to keep the more reliable link in FR1 and also for the WD 22 to consume less power by operating in FR1.

In another approach, the network node 16 may consider an expectation of upcoming traffic based on the current buffer, BSR or historical data, and choose the Scell that enables handling of the additional traffic. Additionally, if the WD 22 has not been brought back from dormancy after N DRX cycles or a specific duration of time, the network node 16 may send the MAC CE Scell deactivation command and deactivate that Scell as well.

In some embodiments above, the network node 16 may determine the parameter N or the specific time duration, based on, for example, one or more of the frequency range, the number of times 0-CC is received consecutively, expected traffic, current DL buffer, BSR, and/or DRX configuration parameters. For example, the network node 16 may set N lower for FR2 than for FR1. Or the network node 16 set N higher for the first time that 0-CC is received, but if 0-CC is received again, the network node 16 may either directly deactivate all the Scells, or consider a lower value of N. In another approach, the network node 16 may consider a combination of expected traffic, or current DL buffer and BSR to determine or select N. Yet in another approach, the network node 16 takes the DRX configuration parameters into account when determining or selecting N. For example, if the ON duration or inactivity timer is higher than a specific threshold, the network node 16 may consider a lower value of N, or even 0, i.e., directly deactivating the Scell. However, if the On duration or inactivity timer is smaller than a specific threshold, a higher value of N may be considered.

WD Indicating which of the Scells to Activate/Deactivate

Depending on the WD 22 implementation (RF architecture), energy may be conserved depending on which of the secondary carriers are activated by the network node 16 rather. These secondary carriers may be implemented in different transceivers that are independently power-managed. The WD 22 may be able to switch off transceivers and processing chains associated with the carriers that are not in use. Hence, for the very same number of component carriers, different power consumption levels (and potentially overheating) will occur in a WD 22 depending on which component carriers the network node 16 activates.

The interoperation of the network node 16 and WD 22 may be according to a common agreement between the WD 22 and the network node 16 that certain contradicting combinations can be used as code points for conveying such information to the network node 16. In general and for example, such combination may be enabled by indicating 0-BW together with non-zero CCs for the same direction (DL/UL).

In one embodiment, the WD 22 indicates which of the presently configured component carriers (CCs) the WD would like to be disabled (i.e., de-configured, deactivated or placed in dormancy) by indicating 0-BW and using the bits in MaxCC-Preference to indicate specific CCs that the network node 16 has already configured. For example, suppose the network node 16 configures the WD 22 with one NR PCell, and 3 SCells. The WD 22 may then signal 0-BW and reducedCCsDL=1 to indicate that it does not prefer the first SCell configured by the network node 16.

In another embodiment, rather than indicating a single CC per signaling, a combination of CCs may be indicated. This may be beneficial in case multiple SCells are set up by the network node 16 and the information is preferably done through as few signals as possible. Assume, for example, the configuration exemplified above where 3 Scells were set up by the network node 16. Suppose the WD 22 does not prefer two of them. Then, the WD 22 may signal that it does not prefer to have the first or the third Scells by indicating 0-BW and reducedCC=3 (i.e. binary 101, where the 1 indicates which of the configured CCs the WD 22 would like to be disabled). In other words the indication may be singular.

Based on the information provided above, the network node 16 may tailor the CCs to WD 22 operational needs in terms of power savings and/or overheating.

In some embodiments, the converse logic may apply. The WD 22 signaling may imply which of the CCs the WD 22 would like to keep instead of which ones it would like to be disabled.

In some embodiments, such contradicting combination is only allowed based on configuration from the network node 16.

Some embodiments may include one or more of the following:

A method in a network node 16 for adapting carrier aggregation operation based on received UAI. The method includes configuring a CA preference UAI FR—, e.g., to specify that the preference is configured over a specific frequency range, specifically to avoid indications that would exclude the Pcell; and configuring a prohibit timer to avoid excessive indications from the WD 22. In some embodiments, the method includes, in response to receiving a 0-CC indication, deactivating additional Scells except one. In some embodiments, the method includes deactivating the remaining Scell if no data is received within a predetermined time from the indication. In some embodiments, the method also includes, in response to receiving a 0-BW indication, deactivating Scells in the indicated FR; and/or A method in a WD 22 to indicate which specific carrier (SCell) the WD 22 prefers to be deactivated or activated so that the network node 16 may adapt the configuration to conserve power and/or reduce overheating.

According to one aspect, a network node 16 configured to communicate with a wireless device (WD 22). The network node 16 includes a radio interface and/or processing circuitry configured to: receive user assistance information, UAI; and determine a transmission bandwidth configuration based at least in part on the UAI indicating a zero bandwidth preference of the WD 22.

According to this aspect, in some embodiments, the transmission bandwidth configuration is further based at least in part on a frequency of transmission of the WD 22. In some embodiments, the transmission bandwidth configuration includes selecting a set of at least one component carrier based at least in part on the UAI indicating zero component carriers. In some embodiments, the transmission bandwidth configuration is further based at least in part on bandwidth indicated by the WD 22 being greater than a threshold. In some embodiments, the transmission bandwidth configuration excludes a primary cell frequency.

According to another aspect, a method implemented in a network node 16, includes receiving user assistance information, UAI; and determining a transmission bandwidth configuration based at least in part on the UAI indicating a zero bandwidth preference of the WD 22.

According to this aspect, in some embodiments, the transmission bandwidth configuration is further based at least in part on a frequency of transmission of the WD 22. In some embodiments, the transmission bandwidth configuration includes selecting a set of at least one component carrier based at least in part on the UAI indicating zero component carriers. In some embodiments, the transmission bandwidth configuration is further based at least in part on bandwidth indicated by the WD 22 being greater than a threshold. In some embodiments, the transmission bandwidth configuration excludes a primary cell frequency.

Some embodiments may include one or more of the following.

Embodiment A1. A network node configured to communicate with a wireless device (WD), the network node configured to, and/or comprising a radio interface and/or comprising processing circuitry configured to:

receive user assistance information, UAI; and determine a transmission bandwidth configuration based at least in part on the UAI indicating a zero bandwidth preference of the WD.

Embodiment A2. The network node of Embodiment A1, wherein the transmission bandwidth configuration is further based at least in part on a frequency of transmission of the WD.

Embodiment A3. The network node of any of Embodiments A1 and A2, wherein the transmission bandwidth configuration includes selecting a set of at least one component carrier based at least in part on the UAI indicating zero component carriers.

Embodiment A4. The network node of any of Embodiments A1-A3, wherein the transmission bandwidth configuration is further based at least in part on bandwidth indicated by the WD being greater than a threshold.

Embodiment A5. The network node of any of Embodiments A1-A4, wherein the transmission bandwidth configuration excludes a primary cell frequency.

Embodiment B1. A method implemented in a network node, the method comprising:

receiving user assistance information, UAI; and determining a transmission bandwidth configuration based at least in part on the UAI indicating a zero bandwidth preference of the WD.

Embodiment B2. The method of Embodiment B1, wherein the transmission bandwidth configuration is further based at least in part on a frequency of transmission of the WD.

Embodiment B3. The method of any of Embodiments B1 and B2, wherein the transmission bandwidth configuration includes selecting a set of at least one component carrier based at least in part on the UAI indicating zero component carriers.

Embodiment B4. The method of any of Embodiments B1-B3, wherein the transmission bandwidth configuration is further based at least in part on bandwidth indicated by the WD being greater than a threshold.

Embodiment B5. The method of any of Embodiments B1-B4, wherein the transmission bandwidth configuration excludes a primary cell frequency.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

3GPP 3rd Generation Partnership Project
5G 5th Generation
BB Baseband
BW Bandwidth
/CDRX Connected mode DRX (i.e. DRX in RRC_CONNECTED state)
CRC Cyclic Redundancy Check
DCI Downlink Control Information
DL Downlink
DRX Discontinuous Reception
EE Energy Efficiency
gNB A radio base station in 5G/NR.
HARQ Hybrid Automatic Repeat Request
IoT Internet of Things
LO Local Oscillator
LTE Long Term Evolution
MAC Medium Access Control
MCS Modulation and Coding Scheme
mMTC massive MTC (referring to scenarios with ubiquitously deployed MTC devices)
ms millisecond
MTC Machine Type Communication
NB Narrowband
NB-IoT Narrowband Internet of Things
NR New Radio
NW Network
PDCCH Physical Downlink Control Channel
PDSCH Physical Downlink Shared Channel
RF Radio Frequency
RNTI Radio Network Temporary Identifier
RRC Radio Resource Control
RS Reference Signal
RX Receiver/Reception
SI System Information
SSB Synchronization Signal Block
T/F Time/Frequency
T/X Transmitter/Transmission
TRS Tracking Reference Signal (or CSI RS for tracking)
UE User Equipment
UL Uplink
WU Wake-up
WUG Wake-up Group
WUR Wake-up Radio/Wake-up Receiver
WUS Wake-up Signal/Wake-up Signaling It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a network node configured to communicate with a wireless device, WD, the method comprising:
- receiving user assistance information, UAI, comprising an indication of at least one of a zero bandwidth for a frequency band and a component carrier to be disabled; and
- determining an allocation of at least one of a bandwidth and at least one component carrier based at least in part on whether the indicated at least one of the zero bandwidth and the component carrier to be disabled would exclude a primary component carrier by which the network node and the WD maintain communication in a cell, determining the allocation including:
  - selecting a component carrier to be disabled in one of a first frequency range and a second frequency range based at least in part on which of the first and second frequency ranges includes the primary component carrier; or
  - allocating carrier power to a component carrier that is not to be disabled.

2. The method of claim 1, further comprising ignoring subsequent UAI for a period of time after receiving first UAI.

3. The method of claim 2, wherein a duration of the period of time is based at least in part on a rate of change of traffic load for the WD.

4. A network node configured to communicate with a wireless device, WD, the network node comprising:
- a radio interface configured to receive user assistance information, UAI, comprising an indication of at least one of a zero bandwidth for a frequency band and an indication of a component carrier to be disabled; and
- processing circuitry in communication with the radio interface and configured to determine an allocation of at least one of a bandwidth and at least one component carrier based at least in part on whether the indicated at least one of the zero bandwidth and the component carrier to be disabled would exclude a primary component carrier by which the network node and the WD maintain communication in a cell, determining the allocation including:

selecting a component carrier to be disabled in one of a first frequency range and a second frequency range based at least in part on which of the first and second frequency ranges includes the primary component carrier; or allocating carrier power to a component carrier that is not to be disabled.

5. The network node of claim 4, wherein determining the allocation includes determining whether a total bandwidth allocated to the WD exceeds a threshold.

6. The network node of claim 4, wherein the processing circuitry is further configured to ignore subsequent UAI received during a period of time after receiving first UAI.

7. The network node of claim 6, wherein a duration of the period of time is based at least in part on a rate of change of traffic load for the WD.

8. The network node of claim 4, wherein, when the indication indicates all component carriers are to be disabled, the processing circuitry is further configured to configure the WD to be in a dormant state while maintaining communication between the network node and the wireless device on the primary component carrier.

9. A method in a wireless device, WD, configured to communicate with a network node, the method comprising:

determining at least one of a zero bandwidth and a component carrier to be disabled based at least in part on an amount of power consumed by circuitry of the WD for each of a plurality of component carriers; and transmitting user assistance information, UAI, comprising an indication of at least one of the determined zero frequency bandwidth and the determined component carrier to be disabled, the indication being based at least in part on the consumed power for each of the plurality of component carriers.

10. The method of claim 9, wherein determining at least one component carrier based at least in part on an amount of consumed power includes determining whether a component carrier is a primary component carrier by which the network node and the WD maintain communication in a cell.

11. The method of claim 9, wherein determining at least one component carrier based at least in part on an amount of consumed power includes selecting a component carrier to be disabled in one of a first frequency range and a second frequency range based at least in part on a power requirement associated with each of the first and second frequency ranges.

* * * * *